A. S. CHESTON.
COMBINED DOVETAIL AND BUFFER OR CUSHIONING DEVICE FOR THE DOORS OF MOTOR CARS AND OTHER VEHICLES.
APPLICATION FILED JAN. 29, 1920.
1,337,042.
Patented Apr. 13, 1920.
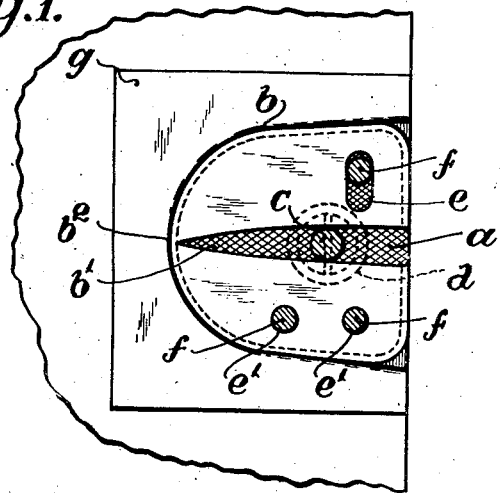
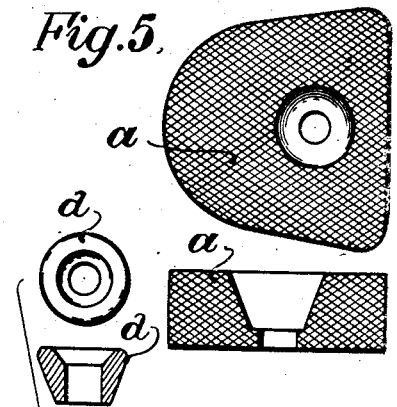
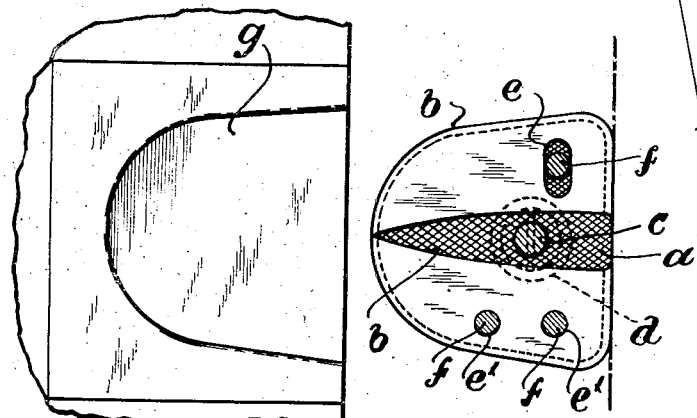
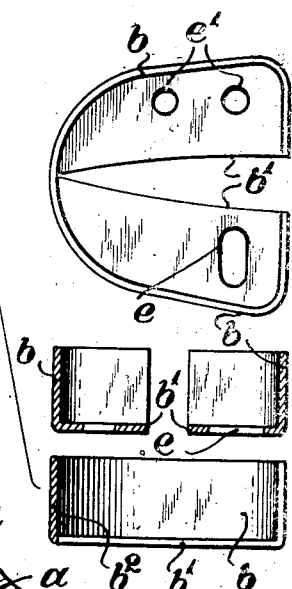
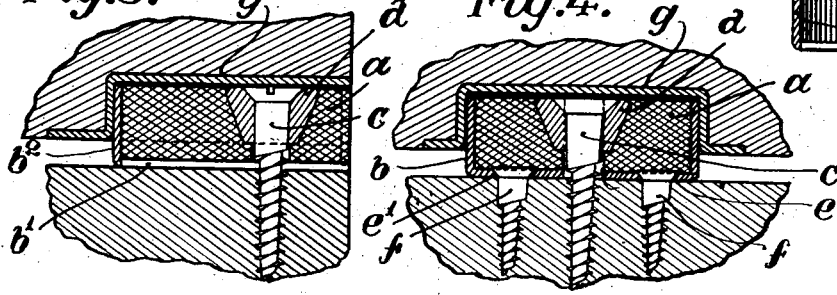
Inventor
Arthur Sam Cheston

UNITED STATES PATENT OFFICE.

ARTHUR S. CHESTON, OF BIRMINGHAM, ENGLAND.

COMBINED DOVETAIL AND BUFFER OR CUSHIONING DEVICE FOR THE DOORS OF MOTOR-CARS AND OTHER VEHICLES.

1,337,042.   Specification of Letters Patent.   Patented Apr. 13, 1920.

Application filed January 29, 1920. Serial No. 354,856.

*To all whom it may concern:*

Be it known that I, ARTHUR SAM CHESTON, subject of the King of Great Britain, residing at Birmingham, England, have invented certain new and useful Improvements in Combined Dovetail and Buffer or Cushioning Devices for the Doors of Motor-Cars and other Vehicles, of which the following is a specification.

This invention relates to combined dovetail and buffer or cushioning devices for the doors of motor-cars and other vehicles, said devices being of that type comprising a rubber block or cushion inclosed within or embraced by the spring arms or branches of a holder secured to the edge of the door and adapted to engage within a recessed shoe fixed to the door-frame, or vice versa, so that the arms or branches are closed toward one another and the rubber buffer compressed between them.

According to the present invention, the rubber cushion is inclosed within a resilient casing comprising a substantially wedge-shaped peripheral portion and having an open front and a closed back, which latter is split longitudinally from the outer end to the peripheral portion at the inner or forward end, which constitutes the hinge about which the upper and lower halves of the casing can turn relatively to one another, and the said back of the casing is adapted to be secured to the door-frame or the like so as not to interfere with the said relative angular movement of the two parts of the casing.

Figure 1 of the accompanying drawings represents a rear elevation of the buffer device, showing the same engaged with and compressed by the shoe which is fixed to the door-frame.

Fig. 2 is a similar view, but with the buffer disengaged from the shoe.

Fig. 3 is a horizontal section and

Fig. 4 is a vertical section, showing how the device is secured to the door.

Fig. 5 shows the component parts separately.

The improved buffer or cushioning device consists of a substantially wedge-shaped block of rubber $a$ inclosed within a similarly shaped sheet-steel casing $b$ which is open at the front, but is gapped or divided longitudinally at $b^1$ along the opposite side and across the wider end, so that the upper and lower halves are connected hinge-wise only at the forward end by the peripheral part of the casing, as at $b^2$, this peripheral part being of a resilient nature so as to allow of the two said halves of the casing being pressed together in order to compress the rubber between them. The device is fixed to the edge of the door by a screw $c$ passed through a metal bush $d$ fitted in the outer uncovered face of the rubber, and also by screws $f$ passed through holes $e$, $e^1$ in the back or closed side of the casing, the hole $e$ in the one half of the latter being elongated in the form of a slot to allow of the relative movement of the two halves when compressing the rubber.

When the door is closed, the above-described dovetail and buffer device is adapted to engage within a recessed shoe or plate $g$ let into the edge of the door frame, the front portion of the recess being narrower than the wider end of the wedge-shaped buffer, so as thereby to press the two halves of the metal casing together and thus compress the rubber block between them, as in Fig. 1, thereby allowing the door a very slight movement corresponding to the stress of traveling on the road, and obviating the necessity of fastening the door by fixed dovetails (with the attendant result of either forcing the pillars out of position or injuring the framing of the door) but at the same time positively obviating any chattering of the door on to the pillars.

Having fully described my invention, what I claim and desire to secure by Letters Patent is:—

1. A combined dovetail and buffer device comprising a rubber cushion inclosed within a resilient casing consisting of a substantially wedge-shaped peripheral portion having an open front and a closed back, which latter is split longitudinally from the outer end to the peripheral portion at the forward end, said peripheral portion constituting the hinge about which the upper and lower halves of the casing can turn relatively to one another, the said back of the casing being adapted to be secured to the door-frame or the like so as not to interfere with the relative angular movement of the two parts of the casing.

2. A combined dovetail and buffer device comprising a rubber cushion inclosed within a resilient casing consisting of a substantially wedge-shaped peripheral portion having an open front and a closed back, which latter is split longitudinally from the outer end to the peripheral portion at the forward end, said peripheral portion constituting the hinge about which the upper and lower halves of the casing can turn relatively to one another, the said back of the casing having holes through which attachment screws can be passed, those holes upon one side of the split being elongated.

In testimony whereof I have hereunto set my hand in the presence of two subscribing witnesses.

ARTHUR S. CHESTON.

Witnesses:
 H. N. SKERRETT,
 W. L. SKERRETT.